(12) United States Patent
Newman et al.

(10) Patent No.: US 10,934,981 B2
(45) Date of Patent: Mar. 2, 2021

(54) PROTECTIVE CAP FOR A POSITIVE CRANKCASE VENTILATION PORT AND A METHOD TO MANUFACTURE

(71) Applicant: Ford Global Technologies, LLC, Dearborn, MI (US)

(72) Inventors: Christopher William Newman, Farmington Hills, MI (US); Sandra Davidson Osip, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 16/223,464

(22) Filed: Dec. 18, 2018

(65) Prior Publication Data

US 2019/0128223 A1  May 2, 2019

Related U.S. Application Data

(62) Division of application No. 15/248,284, filed on Aug. 26, 2016, now Pat. No. 10,215,138.

(51) Int. Cl.
*F02M 35/10* (2006.01)
*F02M 35/104* (2006.01)
(Continued)

(52) U.S. Cl.
CPC .... *F02M 35/10222* (2013.01); *F02M 35/104* (2013.01); *F02M 35/1036* (2013.01);
(Continued)

(58) Field of Classification Search
CPC ... B29C 45/006; B29C 65/06; B29C 65/0672; B29C 65/08; B29C 65/1635; B29C 65/1677; B29C 65/48; B29C 66/1142; B29C 66/1312; B29C 66/52241; B29C 66/532; B29C 66/54; B29C 66/543;
(Continued)

(56) References Cited

U.S. PATENT DOCUMENTS 6,003,501 A  12/1999  Shimazaki et al.
6,546,921 B1  4/2003  Callahan
(Continued)

FOREIGN PATENT DOCUMENTS

JP  02161118  6/1990
WO  2012052820 A1  4/2012

*Primary Examiner* — Christopher J Besler
*Assistant Examiner* — Christine Bersabal
(74) *Attorney, Agent, or Firm* — Geoffrey Brumbaugh; Diana D. Brehob; Brehob Law PLLC

(57) ABSTRACT

A positive crankcase ventilation system for an internal combustion engine routes blowby gases into the intake of the engine. Because the blowby gases have about 12% water vapor, during cold-weather operation, the water vapor may freeze in the PCV valve or in the port that couples the PCV duct with the intake manifold. In situations in which the PCV duct is pointing toward the direction of flow of the intake gases, a hood or cap is placed over the end of the tube according to the present disclosure. It can be as simple as a 90-degree elbow or multiple openings in the cap. A centerline of the openings is perpendicular or at an obtuse angle with respect to the direction of flow in the duct so that the intake gases do not directly access the openings and cause freezing in the openings (or ports).

17 Claims, 6 Drawing Sheets

(51) Int. Cl.
*F01M 13/00* (2006.01)
*B29C 65/16* (2006.01)
*B29C 65/00* (2006.01)
*B29L 31/00* (2006.01)
*B29C 65/06* (2006.01)
*B29C 65/08* (2006.01)
*B29C 65/48* (2006.01)
*B29C 45/00* (2006.01)

(52) U.S. Cl.
CPC ..... *F02M 35/10347* (2013.01); *B29C 45/006* (2013.01); *B29C 65/06* (2013.01); *B29C 65/0672* (2013.01); *B29C 65/08* (2013.01); *B29C 65/1635* (2013.01); *B29C 65/1677* (2013.01); *B29C 65/48* (2013.01); *B29C 66/1142* (2013.01); *B29C 66/1312* (2013.01); *B29C 66/52241* (2013.01); *B29C 66/532* (2013.01); *B29C 66/54* (2013.01); *B29C 66/543* (2013.01); *B29C 66/71* (2013.01); *B29C 66/73921* (2013.01); *B29L 2031/7492* (2013.01); *F01M 13/00* (2013.01)

(58) Field of Classification Search
CPC ............... B29C 66/71; B29C 66/73921; B29L 2031/7492; F01M 13/00; F02M 25/06; F02M 35/10222; F02M 35/10314; F02M 35/10347; F02M 35/1036; F02M 35/104
See application file for complete search history.

(56) References Cited

U.S. PATENT DOCUMENTS

| | | | |
|---|---|---|---|
| 6,782,878 B2 | 8/2004 | Spix | |
| 6,848,436 B2 | 2/2005 | Oota et al. | |
| 7,827,973 B2 | 11/2010 | Vichinsky | |
| 8,919,329 B2 | 12/2014 | Lohr et al. | |
| 8,955,501 B2 | 2/2015 | Tanikawa et al. | |
| 9,382,881 B2 | 7/2016 | Tanikawa et al. | |
| 9,410,457 B2 | 8/2016 | Fujiki et al. | |
| 9,546,580 B2 | 1/2017 | Galeazzi | |
| 9,702,280 B2 | 7/2017 | Kira et al. | |
| 10,006,418 B2 | 6/2018 | Kim et al. | |
| 2003/0070658 A1* | 4/2003 | Warner | F02M 51/005 123/456 |
| 2005/0051138 A1* | 3/2005 | Haley | F02M 35/10026 123/468 |
| 2009/0126670 A1 | 5/2009 | Kado et al. | |
| 2010/0037870 A1 | 2/2010 | Elz et al. | |
| 2014/0048034 A1 | 2/2014 | Cheung et al. | |
| 2014/0158096 A1 | 6/2014 | Leone et al. | |
| 2014/0326226 A1 | 11/2014 | Senda et al. | |
| 2015/0040877 A1 | 2/2015 | Rollins et al. | |
| 2016/0201620 A1 | 7/2016 | Yano | |

\* cited by examiner

PROTECTIVE CAP FOR A POSITIVE CRANKCASE VENTILATION PORT AND A METHOD TO MANUFACTURE

RELATED APPLICATIONS

This application is a divisional of and claims priority to U.S. application Ser. No. 15/248,284 filed 26 Aug. 2016.

FIELD

The present disclosure relates to positive crankcase ventilation systems in internal combustion engines, in particular the port in the intake system through which blowby gases flow.

BACKGROUND

A positive crankcase ventilation (PCV) system for an internal combustion engine is shown in FIG. 1. An internal combustion engine 10 has a crankcase 12 with oil 14 in an oil pan. Oil mist is formed by the crankshaft 16 having connecting rods coupled thereto. An oil mist forms in the crankcase due to oil flying off of rotating components. A small portion of combustion gases in combustion chamber 50 pass by piston 20 into crankcase 12. The blowby gases pick up oil mist. Rather than venting these gases to the atmosphere, they are routed into the combustion chamber to be burned. Crankcase 12 is in fluid communication with a volume above the valvetrain of a cylinder head 24. Engine 10 is a vee engine with two cylinder banks. A PCV valve 26 is provided in one of the banks. A PCV duct 28 couples between PCV valve 26 and intake manifold 44. PCV duct 28 has a port 30 where it couples to intake manifold 44. Fresh air is inducted into engine 10 via an intake duct 40 that has a throttle valve 42 disposed therein. Fresh gases are provided to intake manifold 44 and mix with blowby gases from the PCV duct before entering combustion chamber 50.

Blowby gases are predominantly exhaust gases, which contain approximately 12% water vapor. During cold weather operation, the water vapor can freeze in the PCV system interfering with proper operation. It is known to use heating elements to avoid freezing of the PCV valve, such as described in U.S. Pat. No. 6,546,921. Additionally, the water can freeze in port 30, i.e., the port through which the blowby gases enter into the intake manifold for mixing with the fresh air. Port 30 in FIG. 1 is positioned on the wall of intake manifold 44. To encourage mixing, duct 28 is often extended into manifold 44 so that port 30 is nearer the center of manifold 44. In such a configuration, the flow of the gases is into port 30. When a lot of fresh, cold air flows past the port, the water vapor freezes in the port obstructing the flow.

SUMMARY

In many PCV duct installations into an intake manifold, the port of the duct is not subjected to oncoming fresh intake gases, which when cold can freeze in the duct and negatively impact PCV operation. However, some engine packages place constraints that force the PCV port into the oncoming gases. To overcome the potential for freezing a cap is placed on the end of the duct. The cap closes off the top of the duct and provides openings in the side surface of the cap.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
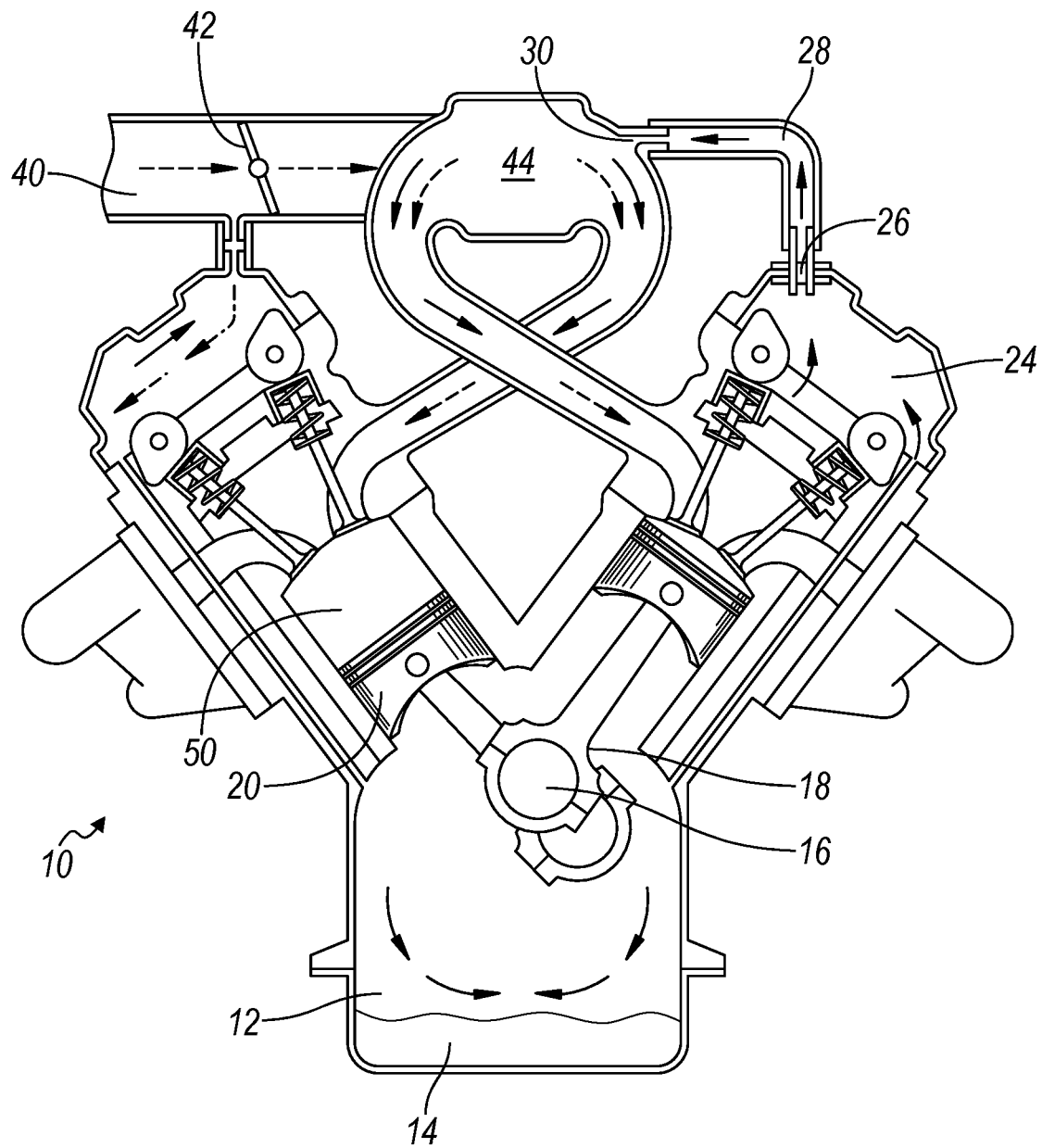
FIG. 1 is an illustration of a PCV system for an internal combustion engine.
Figure 2:
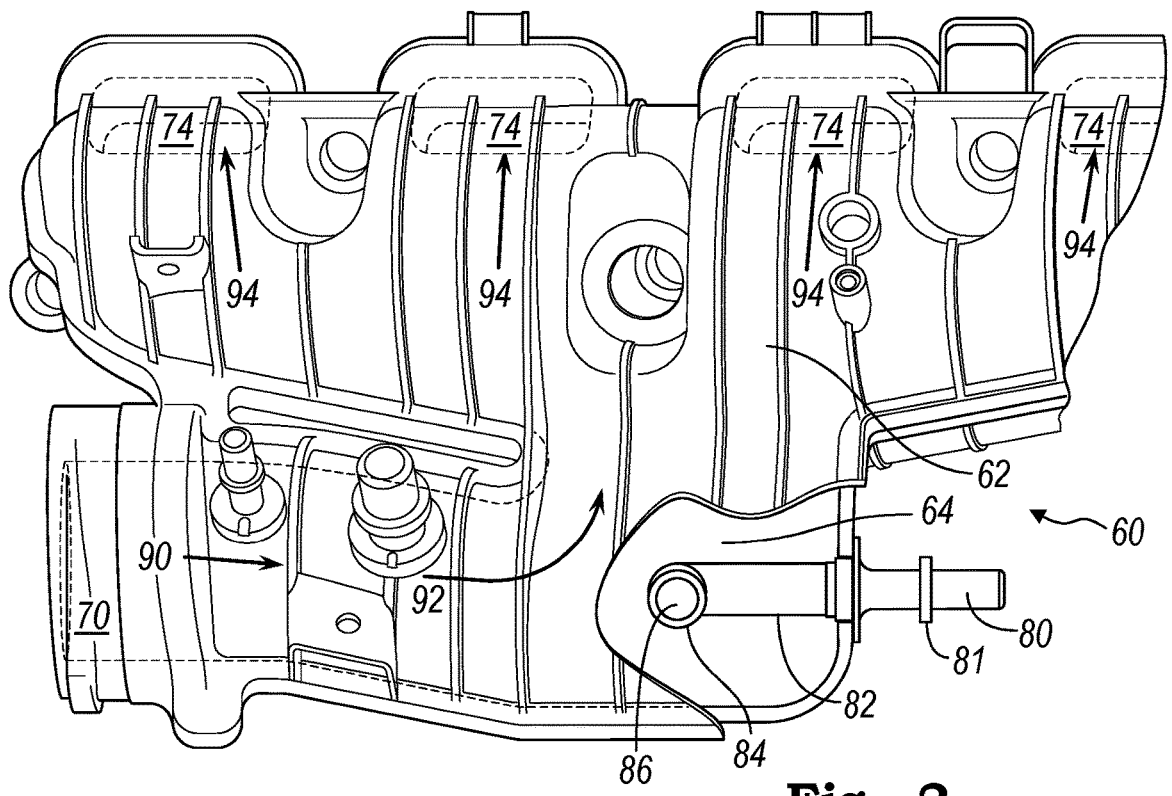
FIGS. 2 and 13 are illustrations of an intake manifold having a PCV port with a cap over the PCV port according to an embodiment of the disclosure.

In FIG. 2, an intake manifold 60 is comprised of an upper shell 62 and a lower shell 64. In the view in FIG. 2, mostly upper shell 62 is visible. A cutout of upper shell 62 is shown in the vicinity of a PCV duct to provide a view of this element. Lower shell 64 is partially visible through the cut out. Fresh gases enter manifold 60 through inlet 70 in the direction shown by arrow 90 and then turns as shown by arrow 92. Air is then delivered to four runners 74 to feed four cylinders as shown by arrows 94. Blowby gases flow into an outer PCV duct 80 via a PCV valve and a tube (not shown). Outer PCV duct 80 has a barb 81 for coupling to the tube. An inner PCV duct 82 extends into manifold 60 to deposit blowby gases into the intake flow. In the embodiment shown in FIG. 2, inner PCV duct has a cap 84. In this example, cap 84 is an elbow at the end of duct 82. Cap 84 has an opening 86, the centerline of which is perpendicular to a centerline of duct 82. It has been found that as long as the flow of fresh intake gases is not pointed directly at the opening of the PCV port, freezing or exhaust water vapor is sufficiently lessened.

In many situations, the PCV duct can be arranged within the intake manifold such that the flow of fresh gases does not impinge directly onto the port of the PCV duct. However, in the example shown in FIG. 2, due to packaging and the layout of the intake manifold, the only place available for an inner PCV duct is directly into the intake flow.

Figure 3:
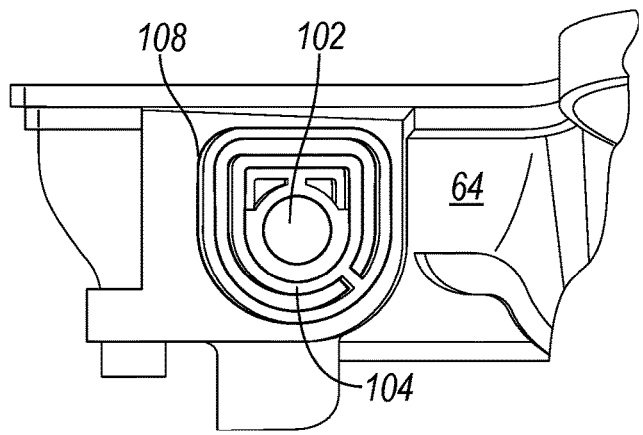
FIG. 3 shows an outer wall of the intake manifold of FIG. 2.
Figure 4:
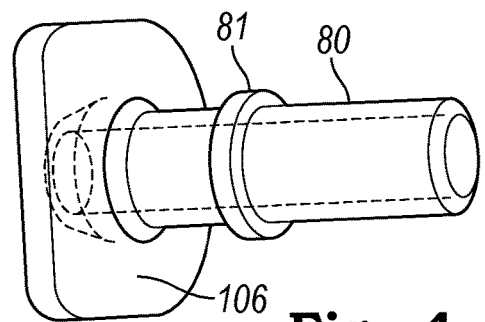
FIG. 4 is a view of an embodiment of an outer PCV duct.

FIG. 3 shows a portion of lower shell 64 of the intake manifold. The wall of lower shell 64 has an orifice 102 to which outer PCV duct (not shown) fluidly couples. In FIG. 4, outer PCV duct 80 includes a flange 106. In some embodiments, main intake manifold housing of FIG. 3 is a plastic that includes carbon black. Duct 80 and flange 106 are made of the same or a similar plastic as lower shell 64, except with no carbon black. Referring back to FIG. 3, a flange 108 on the wall of lower shell 64 includes a weld bead 104 that surrounds orifice 102. A laser is used to weld flange 106 of outer PCV duct via a weld bead 104 on flange 108.

The laser beam is largely transmitted through flange 106 that has no carbon black and is aimed at weld bead 104, which absorbs the laser energy and melts. When weld bead 104 cools, a seal is formed between flange 106 of duct 80 and flange 108.

Figure 5:
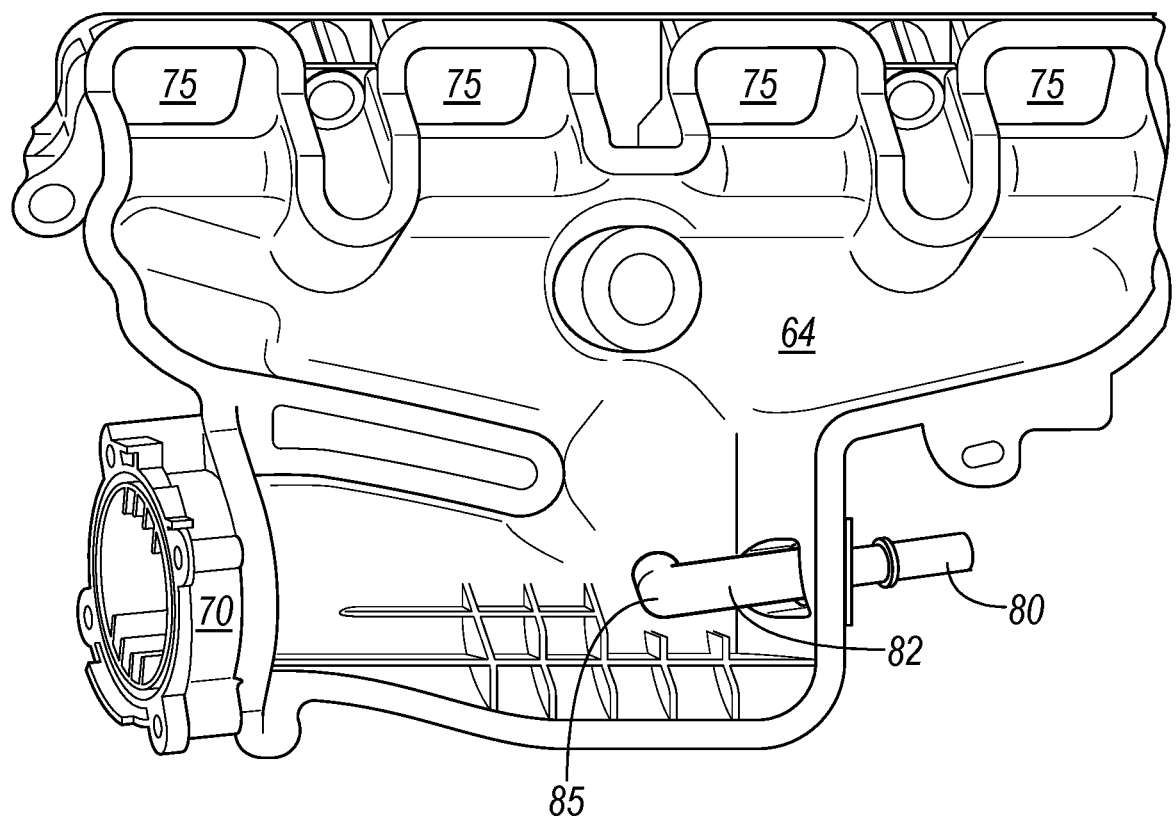
FIG. 5 is a view of a lower shell of the intake manifold of FIG. 2.
Figure 6:
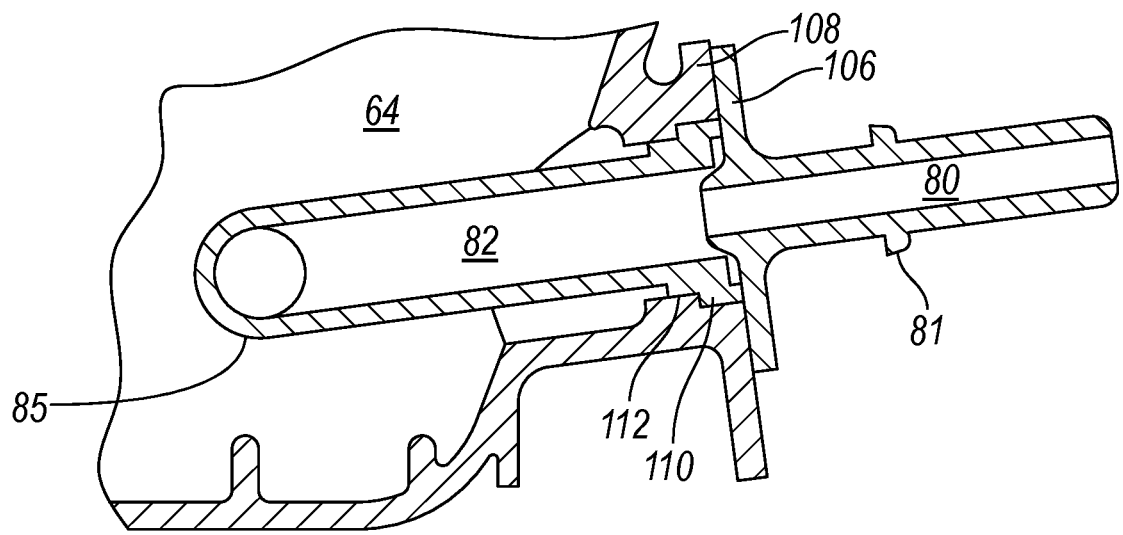
FIGS. 6 and 7 are a close up view and a cross-sectional view of a portion of the intake manifold of FIG. 2.
Figure 7:
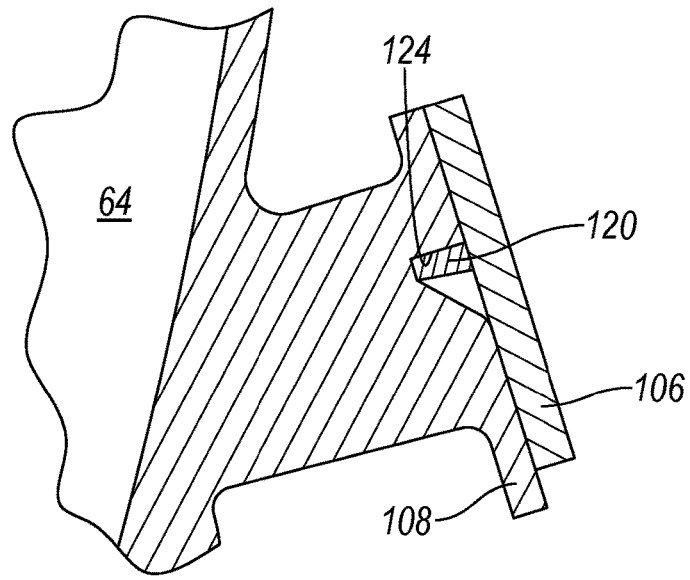

In FIG. 5, a lower shell 64 has inlet 70 and leads to the inside of runner 75 that leads to intake ports of an engine (not shown). Outer PCV duct 80 couples to lower shell 64 and inner PCV duct 82 is held in place in lower shell 64. Greater detail of the coupling of ducts 80 and 82 with lower shell is shown in a cross-sectional, blowup in FIG. 6. Outer PCV duct 80 has flange 106 that sits against flange 108 of lower shell 64. Inner PCV duct 82 has a cap 85 that is an elbow or, alternatively, a tee. Inner PCV duct 82 is assembled by inserting cap end 85 into the orifice in lower shell 64. Inner PCV duct 82 doesn't fall through the orifice due to a shoulder 110 that extends outwardly from inner PCV duct 82 that engages with a shoulder 112 of lower shell 64. In some embodiments, inner PCV duct 82 is not affixed with lower shell 64; it is simply press fit against shoulder 112. A seal is provided by a laser, or other, weld between flange 106 of outer PCV duct 80 and flange 108 of lower shell 64. In FIG. 7, a cross-sectional view of portions of the PCV ducts and lower shell 74 is shown. Flange 108 additionally has a keyway 124 into which a key 120 of inner PCV duct 82 engages (only key 120 of inner PCV duct 82 is visible in FIG. 7). By engaging key 120 into keyway 124, inner duct 82 is indexed so that a desired position of inner PCV duct 82 is ensured so that the cap is positioned in a desired and repeatable configuration.

Figure 8:
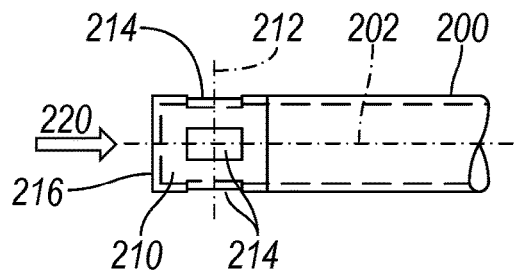
FIGS. 8-11 are alternative embodiments for an inner PCV duct.
Figure 10:
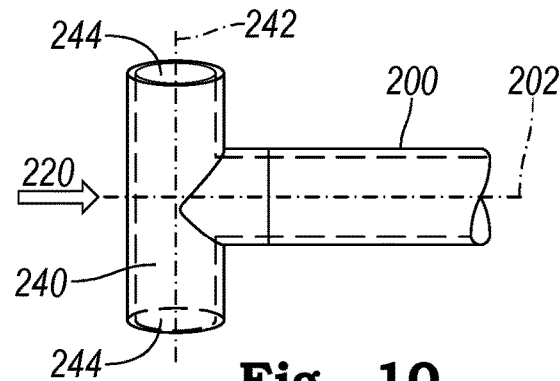

In the embodiment shown in FIGS. 2-7, PCV ducts 80 and 82 are separately formed from lower shell 64 and then assembled. Alternatively, the inner and outer PCV ducts are integrally molded with the lower shell of the intake manifold. A cap is molded separately before being affixed to the tip of the internal portion of the PCV duct. The elbow embodiment of duct 82 is a possible configuration for such an embodiment. Additional alternatives are shown in FIGS. 8-11. In FIG. 8, a portion of a straight duct 200, i.e., a portion of the inner PCV duct, has a centerline 202. A cap 210 has four openings 214, one in the center in the view in FIG. 8, one directly behind the one centered in the view and one upper and one lower. A centerline 212 of the upper and lower openings is perpendicular to centerline 202 of duct 200. Cap 210 has a cover 216 so that fresh intake flow as shown in FIG. 8 by arrow 220 is prevented from directly entering duct 200, but instead enters via openings 212. In an embodiment in FIG. 9, a cap 230 has eight openings around the periphery of the cap. Openings 234 at the top and the bottom have a centerline 232 that is perpendicular with centerline 202 of duct 200. All of openings 234 have centerlines that are substantially perpendicular to centerline 202. In the interest of simplicity in FIG. 9, they are not all illustrated. Cap 230 has a conical cap 236 coming to a point 238. There may be some advantage to conical cap 236 in directing intake air flow (arrow 220) around the obstruction that cap 230 and duct 200 present. In FIG. 10, cap 240 is a tee section coupled to duct 200. A central axis 242 through openings 244 is perpendicular to centerline 202. The arms of tee 240 can be shortened to present less of an obstruction within the intake manifold.

Figure 9:
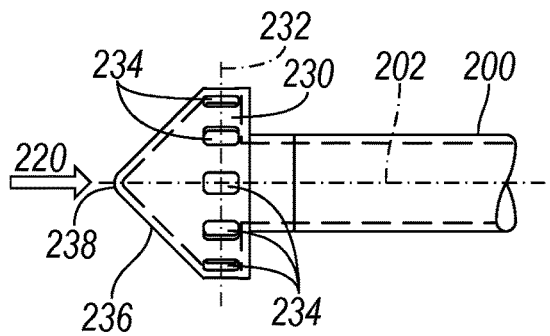
Figure 11:
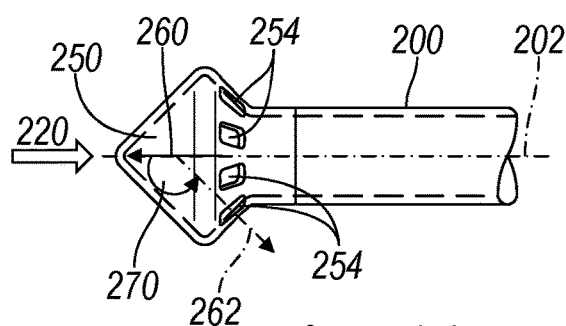

The embodiments in FIGS. 8-10 show centerlines of the openings perpendicular to the centerline of duct 200. For even greater protection from freezing, the holes can be tucked up under the cap, as shown in FIG. 11. Cap 250 has a plurality of openings 254 that are protected by the widest portion of cap 250. A centerline 262 of one of the openings 254 forms an obtuse angle 270 with a centerline of 202 of duct 200. A centerline of duct 200, which is shown by direction of flow of arrow 260 forms an angle greater than 90 degrees with respect to a centerline of opening 254.

Figure 12:
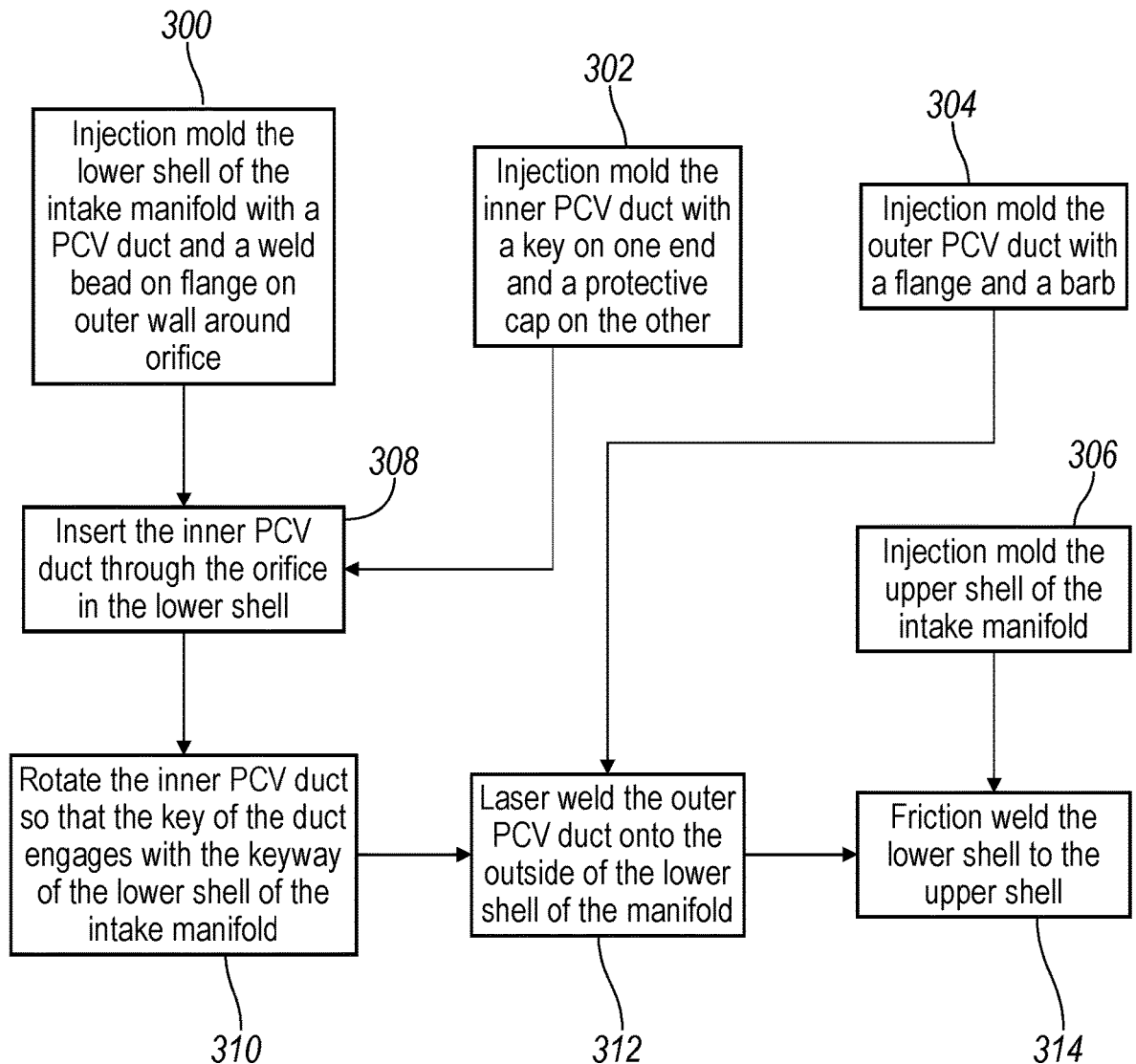
FIGS. 12 and 14 are flowcharts showing process by which intake manifolds according to embodiments of the disclosure are fabricated.

In FIG. 12, a method to fabricate a portion of an intake manifold is shown. In blocks 300, 302, 304 and 306, the lower shell, the inner PCV duct, the outer PCV duct, and the upper shell, respectively, are injection molded or formed by any suitable method. The lower shell has an orifice for a PCV duct, weld bead on the outer surface of the housing surrounding the orifice, a shoulder to capture the inner PCV duct. In block 310, the inner PCV duct is rotated so that the key of the duct engages with the keyway of the lower shell. In block 312, the outer PCV duct is laser welded onto the outside of the lower shell of the intake manifold. The outer PCV duct is made of the same, or similar, plastic as the housing and the inner PCV duct except that the inner PCV duct and housing have carbon black and the outer PCV duct does not. A laser is used to heat up the weld beam, after passing through the flange on the outer PCV duct. In block 314, the lower shell is friction welded to the upper shell.

Figure 13:
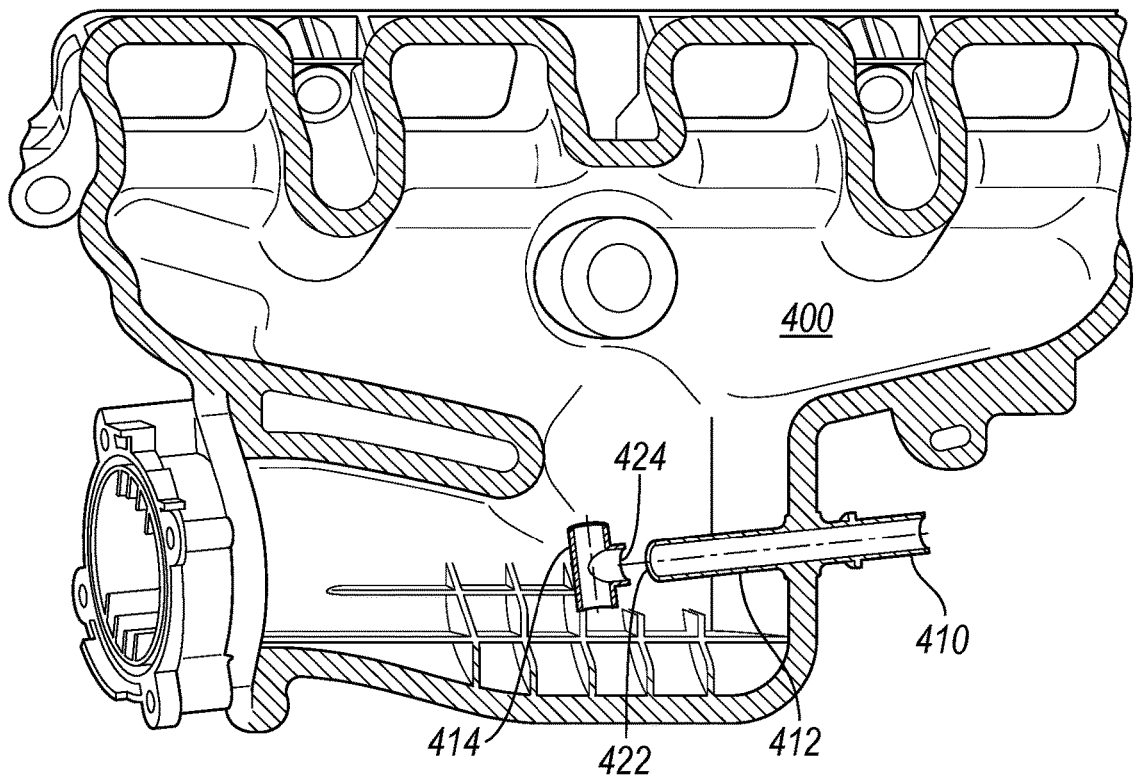

In an alternative embodiment in FIG. 13 a lower shell 400 has an outer PCV duct 410 and an inner PCV duct 412 that are molded in a unitary piece with lower shell 400. A pin can be pulled to formed the inside of ducts 410 and 420 and an orifice through the wall of lower shell 400. In FIG. 13, a cap 414 is shown separate from duct 422. The cap 414 is to be coupled to duct 412 with a tip 422 of duct 412 coupling to a surface 424 of cap 414. Cap 414 and duct 412 can be coupled via friction welding, spin welding, sonic welding, ultrasonic welding, and an adhesive. Cap 414 is a tee. Other cap configurations, such as an elbow or examples shown in FIGS. 8, 9, and 11, or any other suitable alternatives may be substituted for the tee.

Figure 14:
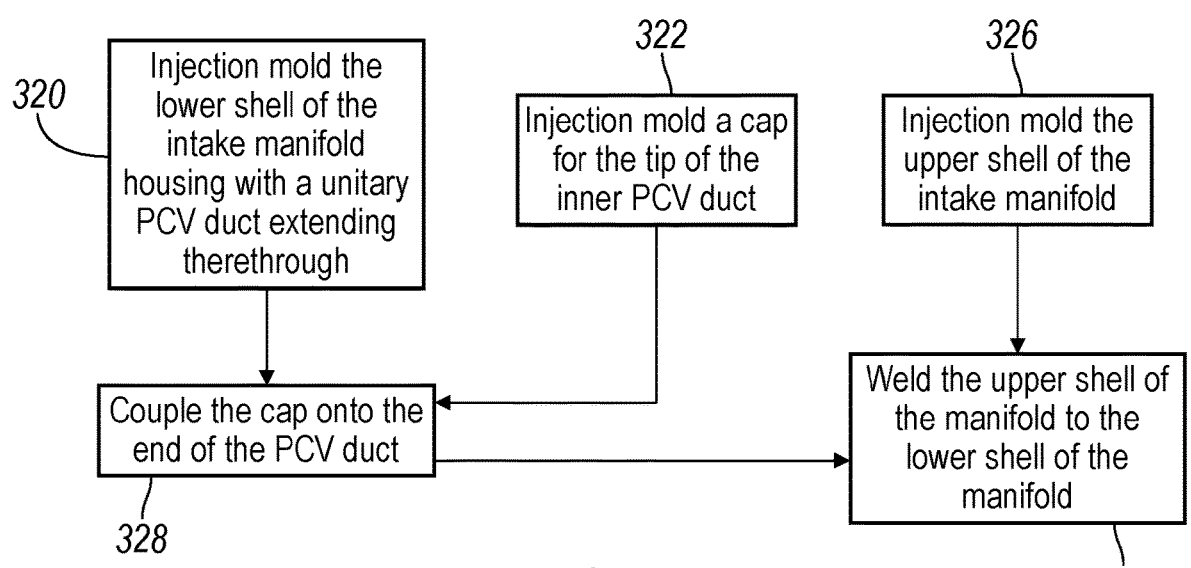

In FIG. 14, the lower shell of the intake manifold, the cap for the tip of the inner PCV duct, and the upper shell of the intake manifold are injection molded in blocks 320, 322, and 326, respectively. The lower shell has a unitary PCV duct that extends therethrough, including the inner PCV duct and outer PCV duct. In block 328 the cap is coupled on the inner end of the PCV duct by any suitable technique such as sonic welding, spin welding, friction welding, and applying an adhesive. In block 330, the upper shell of the manifold is welded to the lower shell of the manifold, or affixed and sealed in any suitable manner.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. A method to fabricate an intake manifold, comprising:
    molding first and second shells of an intake manifold, the first shell having an orifice defined therein;
    molding an inner PCV duct having a cap on a downstream end of the duct;
    molding an outer PCV duct;
    placing the inner PCV duct in the orifice;
    welding the outer PCV duct onto the first shell; and
    welding the first shell onto the second shell.

2. The method of claim 1 wherein:
    the inner PCV duct defines a cylinder therein;
    the cap occludes the cylinder defined by the inner PCV duct;
    a plurality of openings is defined in the cap; and
    the openings are offset from the cylinder defined by the inner PCV duct.

3. The method of claim 1 wherein:
    the cap is a short duct that forms a tee with the inner PCV duct; and
    a centerline of the short duct is perpendicular to a centerline of the inner PCV duct.

4. The method of claim 1 wherein:
    the cap occludes a cylinder defined by the inner PCV duct;
    a plurality of openings is defined in the cap; and
    flow through the inner PCV duct is caused to turn when flowing from the inner PCV duct through one of the plurality of openings.

5. The method of claim 1 wherein:
    the cap is occluded in a direction along the inner PCV duct; and
    the cap defines at least one opening.

6. The method of claim 1 wherein the first shell has a keyway proximate the orifice and the inner PCV duct has a key, the method further comprising: engaging the key into the keyway.

7. The method of claim 6 wherein the engaging the key into the keyway precedes welding the first shell onto the second shell.

8. The method of claim 1 wherein:
    the first shell has a flange with a weld bead surrounding the orifice;
    the outer PCV duct has a flange;
    the first shell is comprised of a material containing carbon black; and
    the outer PCV duct is comprised of a material that transmits laser light, the method further comprising:
    laser welding the flange of the outer PCV duct onto the flange of the first shell.

9. The method of claim 1 wherein:
    the first shell has a shoulder proximate the orifice; and
    the inner PCV duct has a shoulder, the method further comprising:
    engaging the shoulder of the inner PCV duct with the shoulder of the first shell prior to welding the outer PCV duct onto the first shell.

10. The method of claim 1 wherein the inner PCV duct is comprised of a duct portion and the cap, the method further comprising:
    welding the duct portion of the inner PCV duct to the cap.

11. The method of claim 10 wherein the welding the duct portion of the inner PCV duct to the cap precedes the welding the first shell onto the second shell.

12. The method of claim 1 wherein the outer PCV duct has a circumferential barb that extends outwardly from an outer surface of the outer PCV duct.

13. A method to fabricate an intake manifold, comprising:
    molding a first shell of an intake manifold, the first shell having an orifice defined therein;
    molding a second shell of an intake manifold;
    molding an inner PCV duct;
    welding the outer PCV duct onto the first shell; and
    welding the first shell onto the second shell wherein:
        the inner PCV duct has a cap on a downstream end of the inner PCV duct; and
        the cap occludes the cylinder defined by the inner PCV duct.

14. The method of claim 13, further comprising:
    molding an outer PCV duct, wherein:
    the first shell has a flange with a weld bead surrounding the orifice;
    the outer PCV duct has a flange;
    the first shell is comprised of a material containing carbon black; and
    the outer PCV duct is comprised of a material that transmits laser light, the method further comprising:
    laser welding the flange of the outer PCV duct onto the flange of the first shell.

15. The method of claim 13, wherein:
    the first shell has a shoulder proximate the orifice; and
    the inner PCV duct has a shoulder, the method further comprising:
    engaging the shoulder of the inner PCV duct with the shoulder of the first shell prior to welding the outer PCV duct onto the first shell.

16. The method of claim 13 wherein the cap has a plurality of openings defined therein; and the openings are offset from the cylinder defined by the inner PCV duct.

17. The method of claim 13 wherein gases flowing through the inner PCV duct flow are deflected when flowing from the inner PCV duct through one of the plurality of openings.

* * * * *